US012734713B2

(12) United States Patent
Ainley et al.

(10) Patent No.: US 12,734,713 B2
(45) Date of Patent: Sep. 15, 2026

(54) DOCKING STRUCTURE

(71) Applicant: ASTROSCALE LTD, London (GB)

(72) Inventors: Sean Ainley, London (GB); Rosemary Linehan, London (GB); David Gentles, London (GB); Neil Yarr, London (GB); Gediz Hussein, London (GB); Yijun Xiao, London (GB)

(73) Assignee: ASTROSCALE LTD, Harwell (GB)

( * ) Notice: Subject to any disclaimer, the term of this patent is extended or adjusted under 35 U.S.C. 154(b) by 246 days.

(21) Appl. No.: 18/577,503

(22) PCT Filed: Jul. 8, 2022

(86) PCT No.: PCT/GB2022/051779

§ 371 (c)(1),
(2) Date: Jan. 8, 2024

(87) PCT Pub. No.: WO2023/281282

PCT Pub. Date: Jan. 12, 2023

(65) Prior Publication Data

US 2024/0336376 A1 Oct. 10, 2024

(30) Foreign Application Priority Data

Jul. 9, 2021 (GB) ..................................... 2109914

(51) Int. Cl.
*B25J 15/06* (2006.01)
*B64G 1/64* (2006.01)

(52) U.S. Cl.
CPC ........ *B25J 15/0608* (2013.01); *B64G 1/6462* (2023.08)

(58) Field of Classification Search
CPC ........................... B25J 15/0608; B64G 1/6462
See application file for complete search history.

(56) References Cited

U.S. PATENT DOCUMENTS

| | | | | |
|---|---|---|---|---|
| 5,125,601 | A * | 6/1992 | Monford, Jr. | B64G 1/641 901/30 |
| 5,145,227 | A | 9/1992 | Monford, Jr. | |
| 7,543,779 | B1 | 6/2009 | Lewis | |
| 7,815,149 | B1 | 10/2010 | Howard | |
| 8,967,548 | B2 | 3/2015 | Goff | |
| 8,979,034 | B2 | 3/2015 | Goff | |
| 10,309,798 | B2 | 6/2019 | Maeda | |
| 10,882,643 | B2 | 1/2021 | Okada | |
| 10,984,936 | B2 | 4/2021 | Jochum | |

(Continued)

FOREIGN PATENT DOCUMENTS

| | | |
|---|---|---|
| CN | 109398767 | 3/2019 |
| JP | S63270989 | 11/1988 |

(Continued)

*Primary Examiner* — Bernard Rojas
(74) *Attorney, Agent, or Firm* — Jordan IP Law, LLC

(57) ABSTRACT

A docking structure for a satellite includes a magnetic plate and a housing for mounting and constraining the magnetic plate. The magnetic plate includes an outer face and an inner face. The magnetic plate includes a soft magnetic material. The housing extends around at least part of a perimeter of the magnetic plate, over at least part of the outer face of the magnetic plate and over at least part of the inner face of the magnetic plate to mount and constrain the magnetic plate.

16 Claims, 14 Drawing Sheets

(56) References Cited

U.S. PATENT DOCUMENTS

| | | | | |
|---|---|---|---|---|
| 2007/0210212 | A1 | 9/2007 | Tchoryk | |
| 2018/0036889 | A1* | 2/2018 | Birkmeyer | B25J 15/0608 |
| 2018/0229865 | A1 | 8/2018 | Maeda | |
| 2019/0241286 | A1 | 8/2019 | Goff | |
| 2019/0341721 | A1 | 11/2019 | Goff | |
| 2019/0367192 | A1 | 12/2019 | Maeda | |

FOREIGN PATENT DOCUMENTS

| | | |
|---|---|---|
| JP | H04321499 | 11/1992 |
| JP | 2001260998 | 9/2001 |
| JP | 2018192998 | 4/2018 |
| WO | 2006/068884 | 6/2006 |
| WO | 2021/183409 | 9/2021 |

* cited by examiner

DOCKING STRUCTURE

CROSS-REFERENCE TO RELATED APPLICATIONS

This application represents the U.S. National Phase of International Application number PCT/GB2022/051779, entitled "Docking Structure", filed on 8 Jul. 2022, claiming priority to application number GB 2109914.8 filed 9 Jul. 2021, all of which are incorporated herein by reference.

BACKGROUND OF THE INVENTION

This invention relates to a docking structure for a satellite, in particular a docking structure for attaching to a satellite, to allow the satellite to be captured by another craft in space.

Thousands of artificial satellites and other objects orbit above the earth. Once these objects no longer serve a useful function, e.g. they reach they end of their operational lifetime, they have the potential to become "space junk" and cause problems to other (e.g. operational) satellites. If the redundant satellites and objects break up or come out of their operational orbit, the potential for these structures to cause damage to other satellites and objects becomes significant. This situation is becoming more acute as the number of satellites and objects orbiting above the earth increases.

US 2019/0241286 A1 discloses a robotic capture interface that is attached to a satellite or object to be recovered. The interface is captured by a complementary device on another spacecraft, which allows the satellite or object to be manipulated, e.g. so that it may be removed from orbit, relocated to a different orbit or to be serviced. The capture interface contains a magnetised plate that is held in place using a complex system of adhesive and fasteners.

SUMMARY OF THE INVENTION

It is an aim of the present invention to provide an improved docking structure for a satellite.

When viewed from a first aspect the invention provides a docking structure for a satellite, the docking structure comprising:

a magnetic plate; and a housing for mounting and constraining the magnetic plate;

wherein the magnetic plate comprises an outer face and an inner face;

wherein the magnetic plate comprises a soft magnetic material; and wherein the housing extends around at least part of a perimeter of the magnetic plate, over at least part of the outer face of the magnetic plate and over at least part of the inner face of the magnetic plate to mount and constrain the magnetic plate.

The present invention provides a docking structure for (e.g. attaching to) a satellite, i.e. that allows the satellite to be captured (via the docking structure) in space by another craft. The docking structure includes a magnetic plate that has outer and inner faces, and a perimeter (e.g. extending between the outer and inner faces). The magnetic plate is made from a soft (i.e. non-permanent) magnetic material.

A housing of the docking structure is used to mount and constrain the magnetic plate within the docking structure. The housing extends around (e.g. encloses) at least part of the outer face, at least part of the perimeter and at least part of the inner face of the magnetic plate.

It will be appreciated that by providing a housing that mounts and constrains the magnetic plate in a mechanical way, owing to the geometry of the housing extending at least part way around both of the inner and outer faces, and the perimeter, the most suitable materials for the housing and the magnetic plate may be chosen. For example, the housing may be made from a lightweight and rigid material, to provide strength for the structure and the magnetic plate may be made from a suitable magnetically soft material.

This helps to main mechanical robustness and durability of the docking structure, because the structural function of the housing is decoupled from the magnetic attraction function of the magnetic plate. The mounting and constraining of the magnetic plate by the geometry of the housing may also avoid the use of any adhesives to retain the magnetic plate on the docking structure. Furthermore, the arrangement of the magnetic plate and the housing may also help to reduce the effect of thermal cycles, which can be extreme in space, on the different components of the docking structure, e.g. compared to a magnetic plate that was attached to the rest of the docking structure via an adhesive.

The magnetic plate of the docking structure has an outer face and an inner face, as well as a perimeter. Preferably the outer face is arranged to face away from the satellite to which the docking structure is (arranged to be) attached. Preferably the inner face is arranged to face towards the satellite to which the docking structure is (arranged to be) attached. Preferably the perimeter forms the boundary between the outer and inner faces and, e.g., extends between the outer and inner faces.

The magnetic plate may have any suitable and desired geometry. Preferably the outer face has a maximum dimension (e.g. width or diameter) that is (e.g. significantly) greater than the thickness (e.g. in a direction perpendicular to the outer and/or inner faces) of the magnetic plate. Preferably the inner face has a maximum dimension (e.g. width or diameter) that is (e.g. significantly) greater than the thickness (e.g. in a direction perpendicular to the outer and/or inner faces) of the magnetic plate. Preferably the outer face has a maximum dimension (e.g. width or diameter) that is substantially the same as a maximum dimension (e.g. width or diameter) of the inner face.

The magnetic plate may have any suitable and desired dimensions, e.g. to scale to the size and mass of the satellite to which it is to be attached, as appropriate. In one embodiment the magnetic plate has a thickness (the dimension between the outer and inner faces) between 0.1 mm and 5 mm, e.g. between 0.2 mm and 2 mm, e.g. between 0.3 mm and 1 mm, e.g. approximately 0.5 mm. In one embodiment the magnetic plate has a maximum dimension (e.g. diameter) between 50 mm and 500 mm, e.g. between 100 mm and 250 mm, e.g. approximately 150 mm.

In a preferred set of embodiments, the magnetic plate is substantially flat (e.g. substantially planar), e.g. over the majority of the surface area of the magnetic plate. Preferably the outer face and/or the inner face are substantially flat, e.g. substantially planar. Preferably the outer face and the inner face are substantially parallel to each other.

The (e.g. inner and outer faces of the) magnetic plate may have any suitable and desired shape. Preferably the shape of the outer face is substantially the same as the shape of the inner face. Preferably the (e.g. outer face and/or the inner face of the) magnetic plate has a substantially circular shape. Preferably the (e.g. outer face and/or the inner face of the) magnetic plate has one or more (e.g. curved, e.g. scalloped, e.g. semi-circular shaped) indents in the perimeter of the magnetic plate. The overall circular shape of the magnetic plate helps to make the docking structure more compatible with different types of capturing mechanisms and the indents help to locate and retain the magnetic plate in the docking structure.

In one set of embodiments the magnetic plate comprises a step around at least part of the perimeter of the magnetic plate. Providing a step in the magnetic plate may help to locate and retain the magnetic plate in the housing. Preferably the step comprises at least part of the outer face of the magnetic plate, proximal to the perimeter of the magnetic plate, extending (e.g. in a direction perpendicular to a central portion of the magnetic plate) away from a central portion of the magnetic plate (towards the satellite to which the docking structure is (arranged to be) attached).

Thus preferably at least part of the outer face of the magnetic plate, proximal to the perimeter of the magnetic plate, faces outwards from a central portion of the magnetic plate, e.g. in a direction perpendicular to the central portion of the magnetic plate. Similarly, preferably at least part of the inner face of the magnetic plate, proximal to the perimeter of the magnetic plate, faces inwards towards a central portion of the magnetic plate, e.g. in a direction perpendicular to the central portion of the magnetic plate.

In one set of embodiments the magnetic plate comprises a lip around at least part of the perimeter of the magnetic plate. Providing a lip in the magnetic plate may help to locate and retain the magnetic plate in the housing, e.g. instead of or in addition to a step. Preferably the lip comprises at least part of the magnetic plate, proximal to the perimeter of the magnetic plate, extending (e.g. in a direction parallel to a central portion of the magnetic plate) away (e.g. radially outwardly) from a central portion of the magnetic plate. Preferably the lip of the magnetic plate is (e.g. radially) outward of the step in the magnetic plate.

Thus, in a preferred set of embodiments, the magnetic plate comprises a (e.g. Z-shaped) step and a lip around at least part of the perimeter of the magnetic plate. Preferably the lip extends (e.g. in a direction perpendicular to the step of the magnetic plate) towards the perimeter of the magnetic plate from the step. Preferably the step extends (e.g. in a direction perpendicular to the central portion of the magnetic plate) between the central portion of the magnetic plate and the lip of the magnetic plate.

Preferably the surface area of the step and/or lip is (e.g. significantly) less than the surface area of the central portion of the (outer and/or inner face of the) magnetic plate.

The magnetic plate comprises (is made from, e.g. consists of) a soft magnetic material. Preferably the magnetic plate comprises or consists of a ferromagnetic material. Preferably the magnetic plate comprises or consists of a non-permanent magnetic material. Preferably the magnetic plate has a low (e.g. substantially zero) residual magnetic dipole, e.g. the magnetic plate does not generate a magnetic field itself but is able to be attracted by a magnetic field.

These magnetic properties of the magnetic plate help to allow the magnetic plate to be captured (at least partially magnetically) by another spacecraft but help to prevent the magnetic plate from interfering with the navigation systems of the satellite to which the docking structure is (arranged to be) attached.

In one embodiment the magnetic plate comprises or consists of iron, e.g. an iron alloy, e.g. steel, e.g. Hiperco® 50, VACOFLUX® 50 or Permendur 49.

The housing of the docking structure is arranged to mount and constrain the magnetic plate. The housing, which extends around at least part of the perimeter, the outer face and the inner face of the magnetic plate, is preferably arranged to be (the part, or one of the parts, of the docking structure that is to be) captured by (e.g. contacted by) a capturing mechanism of another spacecraft.

The housing may have any suitable and desired shape. In a preferred embodiment the housing comprises a circular perimeter, e.g. surrounding the perimeter of the magnetic plate. This outer circular shape of the housing helps to make the docking structure more compatible with different types of capturing mechanisms and the indents help to locate and retain the housing in the docking structure.

Preferably the housing has a shape that is complementary to the shape of the magnetic plate, so to mount and retain the magnetic plate. Preferably the housing comprises an aperture, wherein the (e.g. central portion of the) outer face of the magnetic plate is mounted in the aperture of the housing. This allows the (e.g. outer face of the) magnetic plate to be accessed (e.g. by the capturing mechanism) through the aperture, e.g. facilitating magnetic attraction.

Preferably the housing comprises an outer rim (e.g. defining the aperture) arranged to retain the magnetic plate, e.g. to substantially prevent the magnetic plate moving in a direction parallel and/or perpendicular to the outer face of the magnetic plate. Preferably the outer rim projects inwards from the perimeter of the housing, e.g. towards the central portion of the outer face of the magnetic plate, e.g. in a direction parallel to the outer face of the magnetic plate.

Preferably the (e.g. outer rim of the) housing comprises one or more (e.g. curved, e.g. scalloped, e.g. semi-circular shaped) projections arranged to retain the magnetic plate, e.g. when the magnetic plate has one or more (e.g. curved, e.g. scalloped, e.g. semi-circular shaped) indents in the perimeter of the magnetic plate. Preferably the one or more projections correspond to (e.g. are aligned with) the one or more (e.g. curved, e.g. scalloped, e.g. semi-circular shaped) indents in the perimeter of the magnetic plate. Preferably the one or more projections extend inwards from the perimeter of the housing, e.g. towards the central portion of the outer face of the magnetic plate, e.g. in a direction parallel to the outer face of the magnetic plate.

In these embodiments, the geometry of the housing helps to increase (e.g. maximise) the exposed surface area of the magnetic plate, which helps to improve the capturing of the docking structure.

The housing may have any suitable and desired dimensions, e.g. to scale to the size and mass of the satellite to which it is to be attached, as appropriate. Preferably the maximum dimension (e.g. diameter) of the housing is substantially the same as the maximum dimension (e.g. diameter) of the magnetic plate, e.g. owing to the (e.g. outer rim of the) housing extending around the perimeter of the magnetic plate.

Thus, in one embodiment, the (e.g. outer rim of the) housing has a maximum dimension (e.g. diameter) between 50 mm and 500 mm, e.g. between 100 mm and 250 mm, e.g. approximately 150 mm. Preferably the (e.g. base plate or the combined base plate and outer rim of the) housing has a thickness (the dimension perpendicular to the face(s) of the magnetic plate) between 5 mm and 50 mm, e.g. between 10 mm and 30 mm, e.g. between 15 mm and 25 mm, e.g. approximately 20 mm.

Thus, in at least preferred embodiments, the housing has a thickness that is greater than a thickness of the magnetic plate. In some embodiments the housing (and, e.g., magnetic plate) has an overall shape that is substantially (e.g. squat) cylindrical.

The housing may mount the magnetic plate in any suitable and desired way. In one embodiment the housing comprises a base plate adjacent the inner face of the magnetic plate, e.g. on which the magnetic plate is mounted. Preferably the base plate of the housing is substantially parallel to the (e.g. inner face of the) magnetic plate. Preferably the base plate extends over (e.g. substantially all of) the inner face of the magnetic plate. Preferably the base plate extends over an area that is greater than or equal to the inner face of the magnetic plate.

The housing may constrain the magnetic plate in any suitable and desired way. In one embodiment the housing comprises a groove that receives at least a part of the perimeter of the magnetic plate. The groove helps to locate and hold the magnetic plate, thus helping to mount and constrain the magnetic plate in the housing, and may negate the need to use any adhesive to retain the magnetic plate. Preferably the groove comprises an annular groove.

Preferably the groove extends (e.g. circumferentially) around an inwardly facing surface of the perimeter of the housing. Preferably the groove has a depth (e.g. a dimension of the groove that extends in a direction perpendicular to the direction in which the groove extends (e.g. circumferentially) around the housing) that extends at least partly in a (e.g. radial) direction parallel to the (e.g. outer and/or inner faces of the) magnetic plate, e.g. from closer to the centre of the magnetic plate (at the opening of the groove) to further away from the centre of the magnetic plate (at the base of the groove). Preferably the groove has a depth that extends at least partly in a (e.g. axial) direction perpendicular to the (e.g. outer and/or inner faces of the) magnetic plate, e.g. from the outer face (at the opening of the groove) towards the inner face (at the base of the groove).

Preferably the groove has a depth that extends at an angle of between 30 degrees and 60 degrees, e.g. between 40 degrees and 50 degrees, e.g. approximately 45 degrees to the (e.g. outer and/or inner faces of the) magnetic plate, e.g. from the outer face closer to the centre of the magnetic plate (at the opening of the groove) towards the inner face further away from the centre of the magnetic plate (at the base of the groove).

In one embodiment the groove is formed in the outer rim of the housing. Preferably the groove is formed between the base plate and the outer rim of the housing. Preferably the base plate and the outer rim of the housing overlap to form the groove.

In a preferred embodiment the base plate and the outer rim of the housing are formed as discrete parts that are attached together to form the housing. In this embodiment, the shape of these separate parts (the base plate and the outer rim of the housing) are preferably shaped such that when they are attached together to form the housing, the groove is formed between them. Thus, preferably the base plate of the housing comprises at least part of the groove and/or the outer rim of the housing comprises at least part of the groove.

In one embodiment the magnetic plate is fastened to the (e.g. base plate of the) housing. Preferably the docking structure comprises one or more fasteners (e.g. bolts or screws) that connect the magnetic plate to the (e.g. base plate of the) housing. Preferably the (e.g. centre of the) magnetic plate comprises an aperture through which a fastener extends to connect the magnetic plate to the (e.g. base plate of the) housing. The fastener, e.g. along with the groove, act to constrain the magnetic plate.

In one embodiment the (e.g. inner face of the) magnetic plate is in contact with (e.g. rests on) the (e.g. base plate of the) housing. The whole of the inner face may contact the housing; however, preferably the (e.g. base plate of the) housing comprises one or more projections that contact the (e.g. inner face of the) magnetic plate.

The one or more projections may take any suitable and desired form. Preferably the one or more projections comprise one or more ridges. Preferably the ridges project from the (e.g. base plate of the) housing in a direction perpendicular to the (e.g. inner face of the) magnetic plate. Preferably the one or more ridges extend over the (e.g. base plate of the) housing in a direction parallel to the (e.g. inner face of the) magnetic plate. Preferably the one or more ridges comprise one or more (e.g. a plurality of) concentric ridges, e.g. that are concentric with the centre of the (e.g. base plate of the) housing (and thus preferably concentric with the centre of the magnetic plate) and/or concentric with each other (when the housing comprises a plurality of concentric ridges).

The base plate and the outer rim of the housing may be attached (e.g. connected) together to form the housing in any suitable and desired way. In one embodiment the housing comprises one or more fasteners (e.g. screws or bolts) to connect the base plate to the outer rim. Preferably the one or more fasteners are arranged around the perimeter of the housing.

Preferably the connection of the base plate to the outer rim acts to sandwich (e.g. clamp) the magnetic plate (e.g. in the groove) between the base plate and the outer rim. Thus preferably the (e.g. main) connection between the base plate and the outer rim of the housing, and thus the way of mounting and constraining the magnetic plate, does not use an adhesive.

The housing may be made from (e.g. comprise or consist of) any suitable and desired material. In one embodiment the housing comprises or consists of iron, e.g. an iron alloy, e.g. steel, e.g. stainless steel, e.g. grade 410 stainless steel, e.g. 410S21 stainless steel. Preferably the housing comprises or consists of aluminium, e.g. an aluminium alloy, e.g. 7075 aluminium alloy, e.g. 7075-T6 aluminium alloy. Aluminium (and alloys thereof) is lightweight and rigid, so is well suited to providing structural strength in a weight efficient manner for a support element of the structure.

In one embodiment the docking structure comprises a resilient (e.g. compliant, e.g. deformable, e.g. compressible) material between at least part of the housing and the magnetic plate. This helps to allow some tolerance between the magnetic plate and the housing, to allow for differential thermal expansion of the magnetic plate and the housing, e.g. owing to them being of different materials, and/or provide some cushioning to the magnetic plate on launch. In one embodiment the resilient material is between the base plate and the magnetic plate. In one embodiment the resilient material is between the outer rim and the magnetic plate. In one embodiment the resilient material is in the groove between the magnetic plate and the (e.g. outer rim and/or the base plate of the) housing.

The resilient material may be used to suspend the magnetic plate within the housing, e.g. without the magnetic plate contacting the (e.g. outer rim and/or the base plate of the) housing. However, in one embodiment (e.g. as outlined above), in addition to the docking structure comprising the resilient material between at least part of the housing and the magnetic plate, part of the magnetic plate is in contact with part of the (e.g. outer rim and/or the base plate of the) housing.

The resilient material may be provided in any suitable and desired form. In one embodiment the resilient material comprises one or more O-rings, e.g. between the outer rim and the magnetic plate, e.g. between the (e.g. base plate of the) housing and the magnetic plate, e.g. in the groove between the magnetic plate and the (e.g. outer rim and/or the base plate of the) housing.

In one embodiment the resilient material comprises one or more pads or (e.g. annular) rings, e.g. between the (e.g. base plate of the) housing and the magnetic plate. When the (e.g. base plate of the) housing comprises one or more projections that contact the magnetic plate, preferably the resilient material is arranged between the one or more projections, e.g. in recesses defined between the one or more projections. In the embodiment in which the one or more projections comprise one or more concentric ridges, preferably the resilient material comprises one or more annular pads arranged between the one or more (e.g. a plurality of) concentric ridges.

The resilient material may be made from (e.g. comprise or consist of) any suitable and desired material. In one embodiment the resilient material comprises or consists of silicone rubber, e.g. space grade silicone (that is suitable for space environment).

The docking structure may be arranged to be attached to (or formed as part of) a satellite in any suitable and desired way. In one embodiment the docking structure is formed as (e.g. an integral) part of a satellite. However, preferably the docking structure is (e.g. formed as) a separate structure that is then attached to a satellite.

In one embodiment the housing of the docking structure may be used to attach the docking structure to a satellite, e.g. the housing may be arranged to attach directly to a satellite. In these embodiments the docking structure may be mounted flush with (e.g. embedded in) the surface of a satellite. The docking structure may be mounted such that the magnetic plate is flush with the surface of a satellite.

In one embodiment the docking structure comprises an attachment member connected to the housing for attaching the docking structure to a satellite. Preferably the attachment member is attached to and extends away from a part of the housing that is adjacent to the inner face of the magnetic plate. Thus the housing, as well as mounting and constraining the magnetic plate, may serve to mount the attachment member for attaching the docking structure to a satellite.

The attachment member may take any suitable and desired form. In one embodiment the attachment member comprises one or more (preferably a plurality of, e.g. six) struts extending from the housing for attaching the docking structure to a satellite. Preferably the plurality of struts connect to the housing via a plurality of (e.g. three) mounting points. Preferably two or more (e.g. a pair of) struts connect to the housing at each mounting point.

Preferably the attachment member comprises a plurality of (e.g. three) mounting points for attaching the docking structure to a satellite. Preferably two or more (e.g. a pair of) struts connect at each mounting point for attaching the docking structure to a satellite.

In a preferred embodiment the plurality of struts extend between the mounting points on the housing and the mounting points for attaching the docking structure to a satellite. Preferably the plurality of struts extend between these mounting points in a zig-zag configuration, e.g. with a pair of struts extending from a common mounting point on the housing to different mounting points for attaching the docking structure to a satellite and/or with a pair of struts extending from a common mounting point for attaching the docking structure to a satellite to different mounting points on the housing. Such an arrangement has been found to be structurally robust and helps to balance the forces that may be transmitted through to the satellite, e.g. during capture of the docking structure.

The attachment member (e.g. the struts) may have any suitable and desired dimensions. In one embodiment the attachment member is arranged to space the housing and/or the magnetic plate from the satellite by a distance (e.g. the attachment member has a dimension from where it attaches to the housing to the mounting points for attaching to a satellite) of between 5 mm and 250 mm, e.g. between 50 mm and 200 mm, e.g. between 120 mm and 180 mm, e.g. approximately 140 mm or 160 mm. This distance may, for example, correspond to the length of the struts.

In one embodiment the docking structure does not comprise an attachment member connected to the housing. Instead, the (e.g. housing of the) docking structure may be arranged to be connected directly to (e.g. recessed in) the surface of a satellite. For example, the (e.g. housing of the) docking structure may comprise one or more fixing members (e.g. bolts or screws) for connecting the housing to a satellite.

In one embodiment the (e.g. housing and/or magnetic plate of the) docking structure comprises one or more fiducial markers. Fiducial marker(s) help the docking structure to be identified and located by the capturing satellite, and help the capturing satellite to orient itself relative to the docking structure. Preferably the fiducial marker(s) are arranged on the outer face of the magnetic plate and/or on the surrounding (e.g. outer rim of the) housing.

The fiducial marker(s) may be arranged in any suitable and desired way. In one embodiment the docking structure comprises a plurality of fiducial markers, wherein the plurality of fiducial markers are a plurality of different shapes and/or sizes, e.g. have a plurality of different maximum dimensions. Providing differently shaped and/or sized fiducial markers helps the docking structure to be identified and located at a plurality (e.g. range) of different distances away from the docking structure.

In one embodiment one of the fiducial markers (of the plurality of fiducial markers) substantially surrounds another of the fiducial markers, e.g. two or more fiducial markers are nested with respect to each other. Preferably two or more of the fiducial markers (of the plurality of fiducial markers) are arranged concentrically relative to each other (i.e. sharing a common centre point). Preferably one or more of the plurality of fiducial markers (e.g. that surround each other, e.g. concentrically) comprise a (e.g. regular) polygon, e.g. a square. Preferably one or more of the plurality of fiducial markers comprises a circle.

In a preferred embodiment the magnetic plate comprises two (or more) square concentrically arranged fiducial markers and two (or more, e.g. three or four) circular fiducial markers, e.g. arranged outside of the square fiducial markers. Preferably the square concentrically arranged fiducial markers comprise an inner square within an outer square. Preferably the inner square comprises a filled square. Preferably the outer square comprises a square annulus, e.g. having a constant width of the annulus around the square annulus.

Preferably one or more of the (e.g. polygon (e.g. square)) fiducial marker(s) comprise a (e.g. geometric) pattern (e.g. surface decoration within the polygon). This may be used to help determine the orientation and/or position of the fiducial marker(s) and thus the docking structure, relative to the capturing spacecraft. In one embodiment one or more of the (e.g. polygon (e.g. square)) fiducial markers comprises an ArUco marker. Preferably the inner square comprises an ArUco marker.

Preferably the pattern and/or geometry of one or more of the (e.g. polygon (e.g. square)) fiducial marker(s) is arranged to allow the orientation and/or position of the magnetic plate (e.g. relative to the capturing spacecraft) to be determined. Preferably each side of the outer square (e.g. the square annulus) comprises a gap (e.g. extending across the width of the square annulus). This preferably forms four linked "L" shapes, which make up the square annulus, with a gap between each "L" shape. Preferably the gaps in the sides of the square are positioned such that two or more of the "L" shapes have a different ratio of the lengths of the two legs of the respective "L" shape.

This helps to allow the orientation and/or position of the magnetic plate to be determined by (e.g. a computer vision system of) the spacecraft that is capturing the docking structure, relative to the capturing spacecraft, because the "L" shapes may be arranged in a unique rotational arrangement. It may also allow the orientation and/or position to be determined independently of the relative angle between the magnetic plate and (e.g. a computer vision system of) the capturing spacecraft.

The fiducial marker(s) may be provided in any suitable and desired way. In one embodiment the docking structure comprises a (e.g. thin) outer layer comprising one or more of the one or more fiducial markers, wherein the outer layer attached to the outer face of the magnetic plate and/or on the surrounding (e.g. outer rim of the) housing. Preferably the inner (e.g. polygon) fiducial marker(s) are arranged on the outer layer.

Preferably the outer (e.g. circular) fiducial marker(s) comprise cap(s) of the fastener(s) that are used to connect the base plate of the housing to the outer rim of the housing. Thus preferably the outer (e.g. circular) fiducial marker(s) screw onto the fastener(s). Preferably the fasteners screw into one or both of the base plate and the outer rim, so the outer fiducial marker(s) are not necessarily used to hold the base plate and the outer rim of the housing together.

Preferably one or more of the fiducial marker(s) are reflective, e.g. to incident laser light. Preferably the circular fiducial marker(s) (e.g. that are arranged outside of the square fiducial markers) are reflective.

Preferably one or more of the fiducial marker(s) are non-reflective. Preferably the polygon (e.g. square) fiducial marker(s) are not reflective, e.g. to incident laser light. The use of reflective and non-reflective fiducial markers may help to provide both long and short range fiducial patterns. For example, the reflective (e.g. circular) fiducial markers may allow the docking structure to be detected from a longer distance (e.g. owing to their reflectivity), while the non-reflective (e.g. polygon) fiducial marker(s), e.g. the patterned square(s), may allow further information about the docking structure (e.g. its orientation and/or position) to be detected (and the orientation and/or position determined) at a closer distance.

The arrangement of the fiducial markers is considered to be novel and inventive in its own right. Thus, when viewed from a further aspect the invention provides a magnetic plate for a satellite comprising a plurality of fiducial markers for detecting by a remote spacecraft, wherein the plurality of fiducial markers comprise:

one or more reflective fiducial markers for reflecting light incident from the remote spacecraft; and one or more fiducial markers having a geometry and/or a pattern for determining an orientation and/or position of the magnetic plate relative to the remote spacecraft;

wherein the one or more reflective fiducial markers are configured to be detected by the remote spacecraft from a distance between the remote spacecraft and the magnetic plate that is greater than a distance between the remote spacecraft and the magnetic plate at which the geometry and/or the pattern of the other fiducial marker(s) are configured to be detected.

It will be appreciated that this aspect of the invention may, and preferably does, include one or more (e.g. all) of the preferable and optional features outlined herein with respect to other aspects and embodiments of the present invention.

The docking structure may be used with (i.e. attached to) any suitable and desired type of satellite. Similarly, the docking structure may be arranged to be captured by any suitable and desired type of (capturing mechanism of a) spacecraft. The docking structure may be arranged to be captured magnetically and/or mechanically, e.g. magnetically captured using the (magnetic) magnetic plate and/or mechanically captured (grabbed) around the (e.g. outer rim of the) housing.

The capturing spacecraft preferably comprises a capturing mechanism arranged to capture the docking structure, e.g. magnetically and/or mechanically. Preferably the capturing spacecraft is (e.g. comprises a computer vision system) arranged to identify and/or determine the orientation and/or position of the docking structure.

Preferably the capturing spacecraft is (e.g. comprises thrusters) arranged to position and orient the capturing spacecraft relative to the docking structure, to allow the capturing mechanism to capture the docking structure, e.g. magnetically and/or mechanically.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENTS

Thousands of artificial satellites and other objects orbiting above the earth are contributing to an increasing amount of "space junk", when such satellites and objects become redundant, which has to potential of causing problems to other (e.g. operational) satellites. Attaching a docking structure to satellites and using this to capture the satellite from another spacecraft, allows such satellites to be manipulated, e.g. removed from orbit so that they do not become space junk, relocated in a different orbit or serviced in orbit.

An embodiment of a docking structure for attaching to a satellite, to allow the satellite to be captured by another spacecraft (i.e. any craft operating in a space environment), will now be described.

Figure 1:
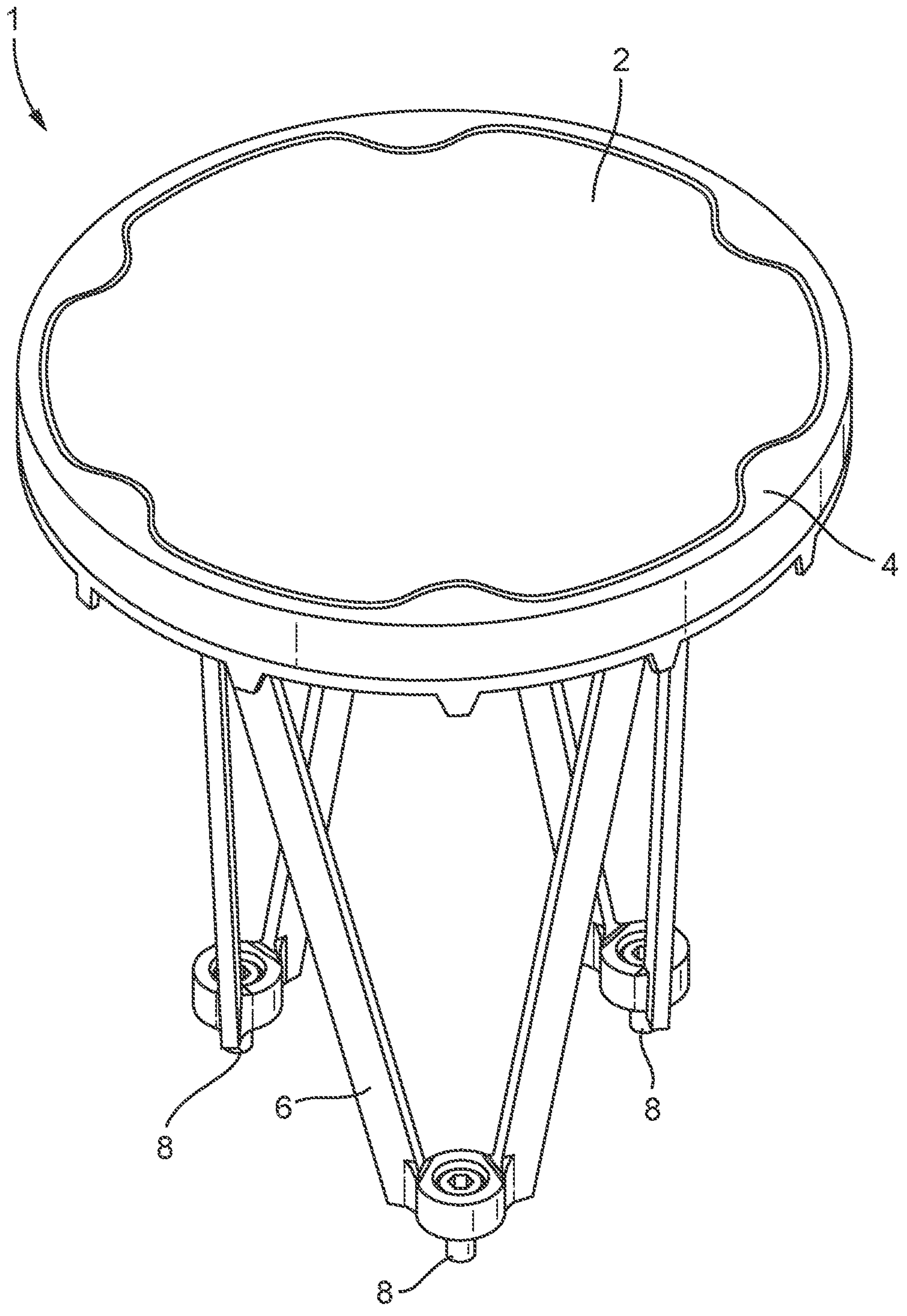
FIG. 1 shows a perspective view of a docking structure for attaching to a satellite, according to an embodiment of the present invention.

FIG. 1 shows a perspective view of a docking structure 1 for attaching to a satellite, according to an embodiment of the present invention. The docking structure 1 includes a magnetic plate 2, a housing 4 and an attachment member 6 for attaching the docking structure 1 to a satellite.

The magnetic plate 2 is made from Hiperco® 50 steel, which is a magnetically soft ferromagnetic material. The magnetic plate 2 is mounted on and constrained by the housing 4. The housing 4 is made from 7075-T6 aluminium alloy. The attachment member 6, which is also made from 7075-T6 aluminium alloy, is connected to the opposite side of the housing 4. The attachment member 6 includes three mounting points 8 for attaching the docking structure 1 to a satellite.

Figure 2:
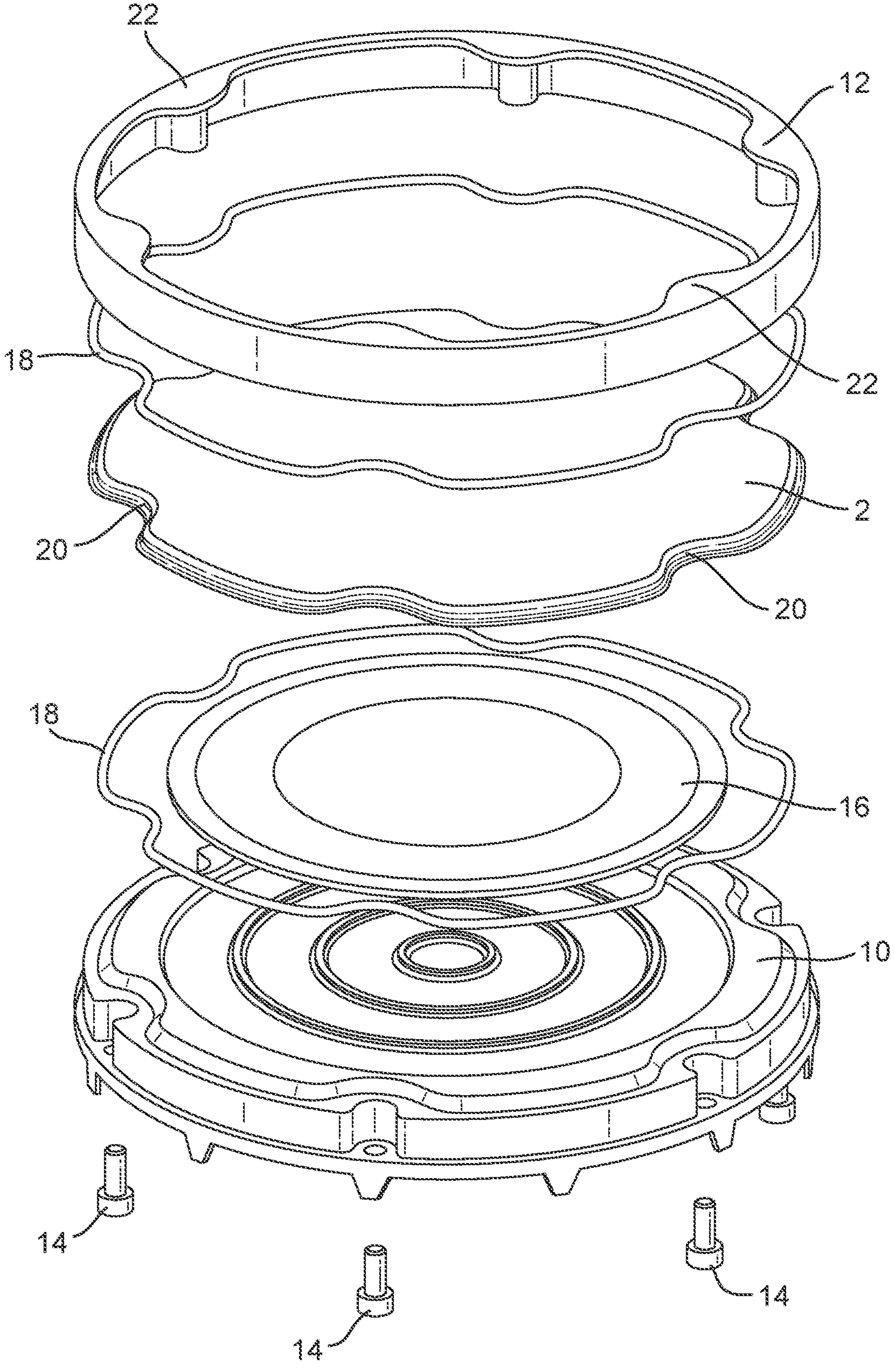
FIG. 2 shows an exploded view of the magnetic plate and the housing of the docking structure shown in FIG. 1.

FIG. 2 shows an exploded view of the magnetic plate 2 and the housing 4 of the docking structure 1 shown in FIG. 1. The housing 4 includes two main parts: a base plate 10 and an outer rim 12. The base plate 10 and the outer rim 12 are connected together by bolts 14 that pass through the respective perimeters of the base plate 10 and the outer rim 12. The base plate 10 and the outer rim 12, when connected together by the bolts 14, act to sandwich the magnetic plate 2 in the housing 4.

FIG. 2 also shows that the docking structure 1 includes a silicone rubber disc 16 (made from space grade silicone rubber) between the base plate 10 of the housing 4 and the magnetic plate 2, and a pair of silicone rubber O-rings 18 (made from space grade silicone rubber), one between the base plate 10 of the housing 4 and the magnetic plate 2, and the other between the outer rim 12 of the housing 4 and the magnetic plate 2. The silicone rubber disc 16 and the silicone rubber O-rings 18 act to hold the magnetic plate 2 in the housing, and provide some tolerance between the various components, e.g. to allow for differential thermal expansion.

FIG. 2 also shows that the magnetic plate 2 has a generally circular shape with scalloped indents 20. The outer rim 12 of the housing 4 has scalloped projections 22 that correspond to and mate with the indents 20 of the magnetic plate 2. The O-rings 18 are shaped to follow the outline of the magnetic plate 2.

Figure 3A:
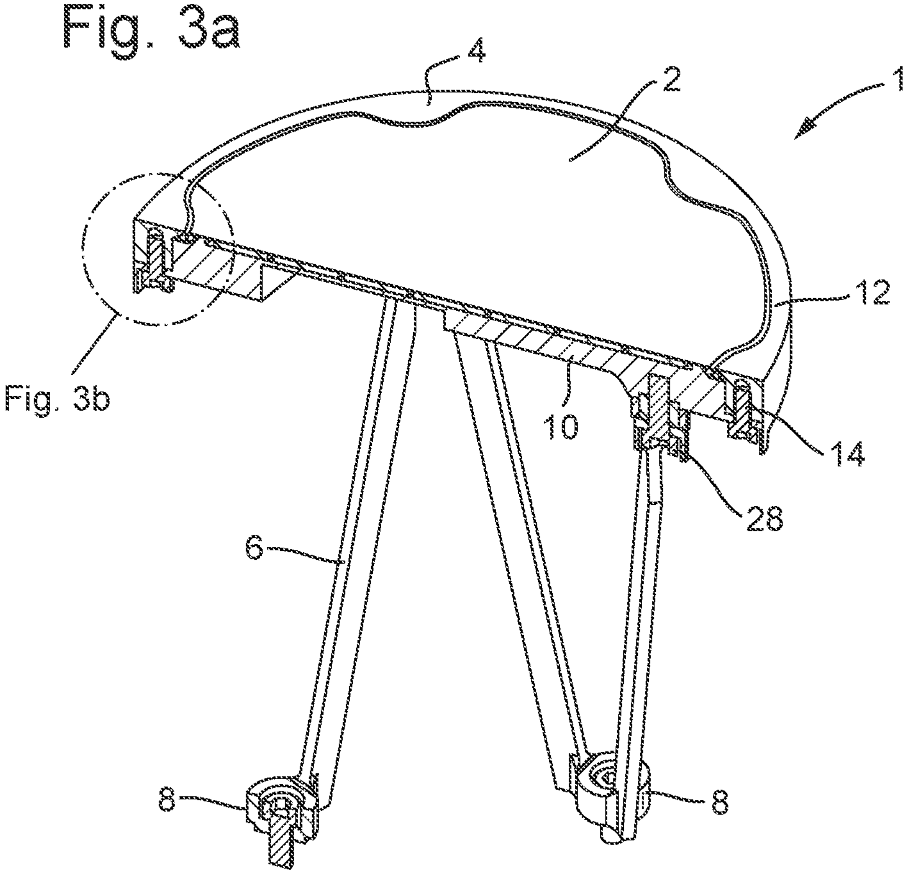
FIGS. 3*a* and 3*b* show a cross-sectional view of the docking structure shown in FIGS. 1 and 2.
Figure 3B:
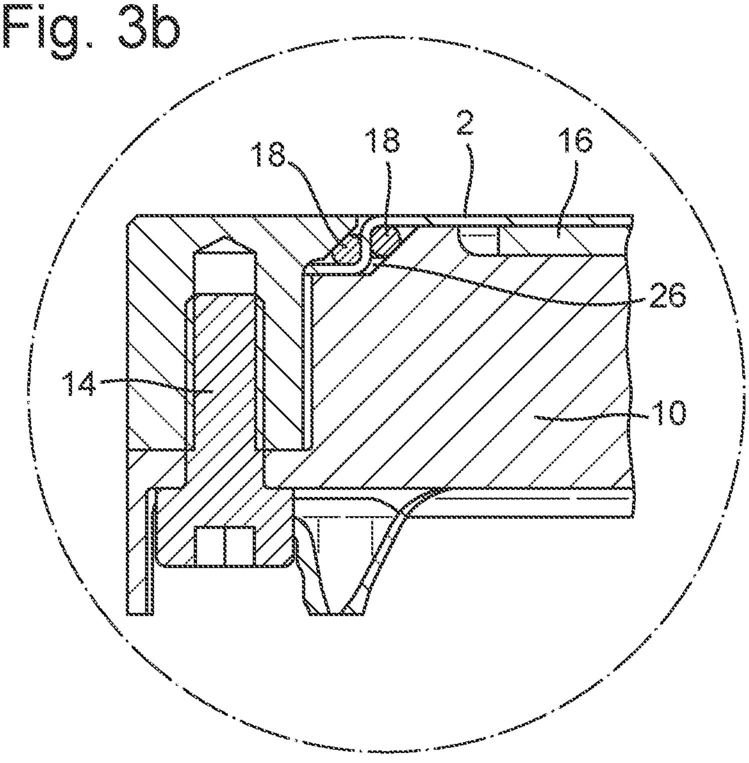

FIGS. 3*a* and 3*b* show cross-sectional views of the docking structure 1 shown in FIGS. 1 and 2. FIG. 3*b* is an enlarged section of FIG. 3*a*.

The cross-sectional views of FIGS. 3*a* and 3*b* illustrate how the base plate 10 and the outer rim 12 of the housing 4 sandwich the magnetic plate 2 therebetween. The bolts 14 that hold the base plate 10 and the outer rim 12 of the housing 4 together pass through the base plate 10 to screw into the perimeter of the outer rim 12, in the scalloped projections 22 of the outer rim 12.

As can be seen most clearly in FIG. 3*b*, the magnetic plate 2 comprises a Z-shaped step and lip at the perimeter of the magnetic plate 2. The base plate 10 and the outer rim 12 of the housing 4 are shaped so to form an angled groove 26 in the housing 4. The O-rings 18 are arranged either side of the magnetic plate 2, in the angled groove 26, so to suspend the step and lip of the magnetic plate 2 in the groove 26, and constrain the magnetic plate 2 in the housing. The silicone rubber disc 16, between the base plate 10 of the housing 4 and the magnetic plate 2, also helps to suspend the magnetic plate 2 in the housing 4.

FIG. 3*a* also shows that the attachment member 6 connects to the base plate 10 of the housing 4 via three mounting points 28 (only one of which can be seen in FIG. 3*a*), with a bolt passing through each mounting point 28 to screw into the base plate 10 of the housing 4.

Figure 4:
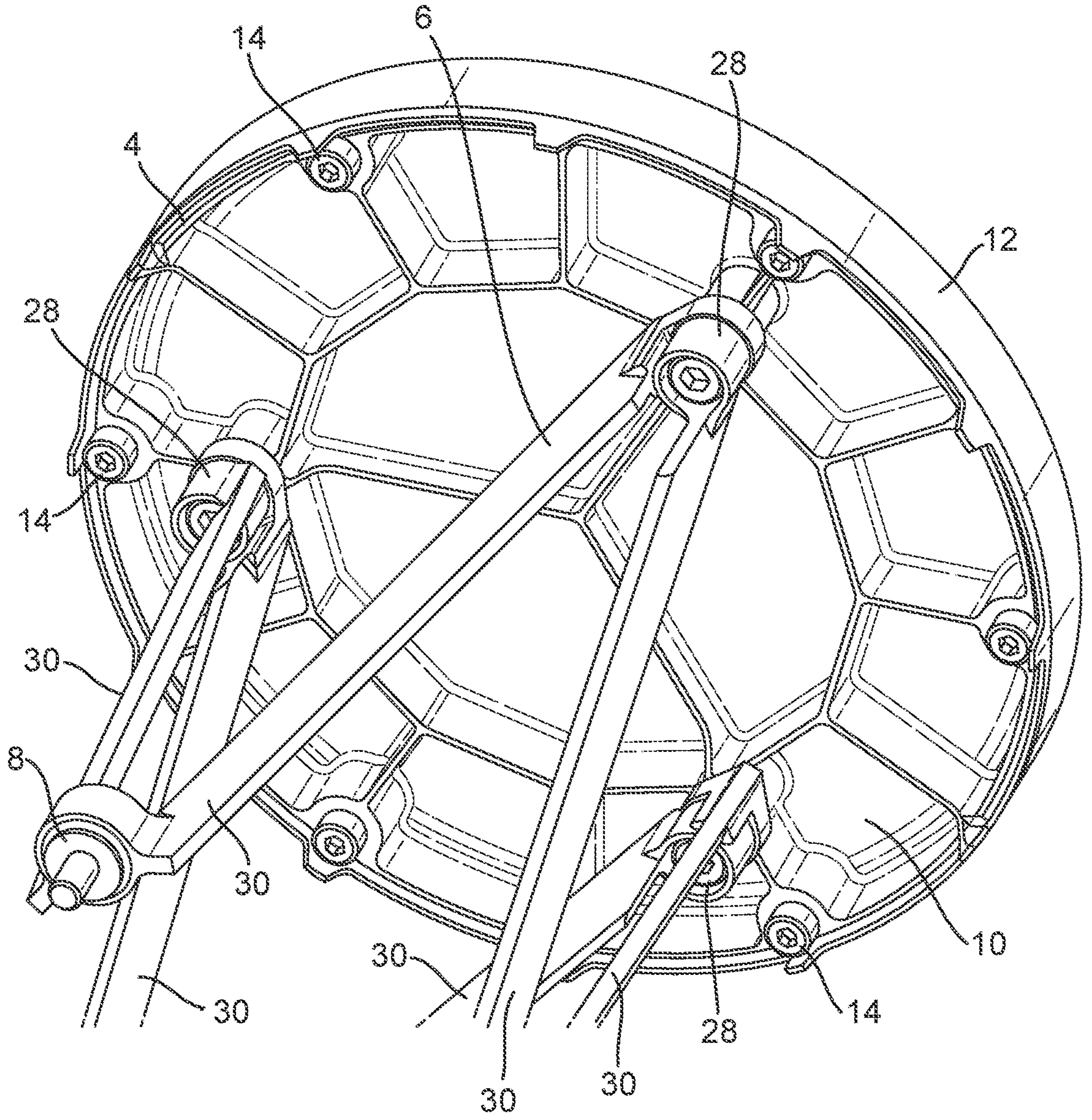
FIG. 4 shows a different perspective view of the docking structure shown in FIGS. 1, 2, 3*a* and 3*b;*

FIG. 4 shows a different perspective view of the docking structure 1 shown in FIGS. 1, 2, 3*a* and 3*b*. From this angle, the three mounting points 28 for the attachment member 6 to connect to the base plate 10 of the housing 4 can be seen. The attachment member 6 has six struts 30, two of which meet at each mounting point 28. Two struts 30 also meet at each of the mounting points 8 for attaching the docking structure 1 to a satellite, such that the six struts 30 form a zig-zag configuration of the attachment member 6.

FIG. 4 also shows the bolts 14 that pass through the base plate 10 of the housing 4 to screw into the perimeter of the outer rim 12, in order to hold the housing 4 together.

Figure 5:
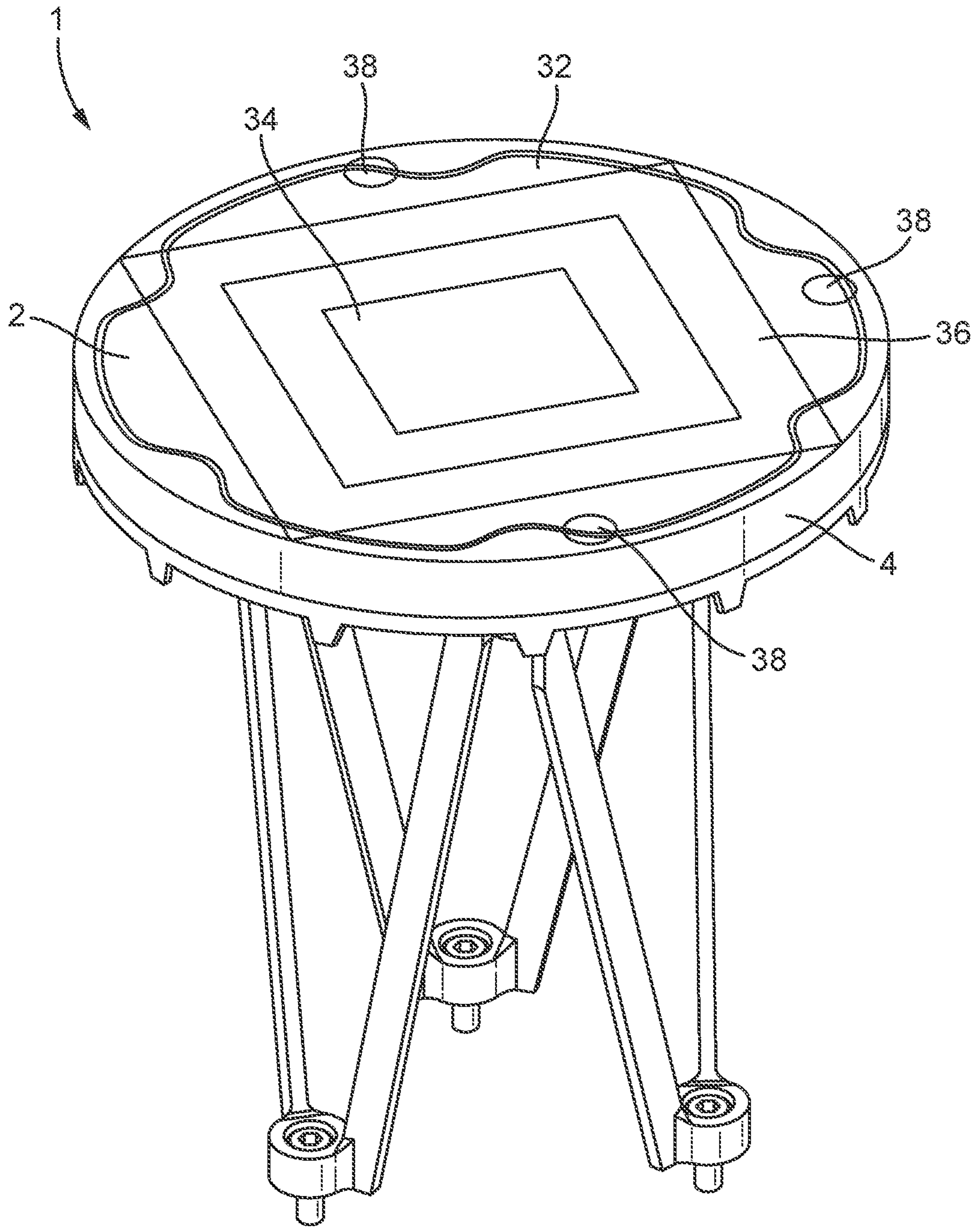
FIG. 5 shows another perspective view of the docking structure shown in FIGS. 1, 2, 3*a*, 3*b* and 4.

FIG. 5 shows another perspective view of the docking structure 1 shown in FIGS. 1, 2, 3*a*, 3*b* and 4. The docking structure 1 is shown with a cover 32 over the magnetic plate 2 and the housing 4. The cover 32 has multiple fiducial markers 34, 36, 38 formed thereon. The fiducial markers 34, 36, 38 include a central square 34, an outer square annulus 36 and three circles 38.

The circular fiducial markers 38 are formed from reflective material. The central square 34 comprises an ArUco marker. The outer square annulus 36 comprises gaps in the sides of the annulus to form four "L" shapes, three of them having a different aspect ratio of the lengths of the legs of the respective "L" shape.

The fiducial markers 34, 36, 38 help the docking structure 1 to be identified and located by a capturing satellite, and help the capturing satellite to orient itself relative to the docking structure 1. The differently shaped and sized fiducial markers 34, 36, 38 help the docking structure 1 to be identified and located at a range of different distances away from the docking structure 1.

Figure 6:
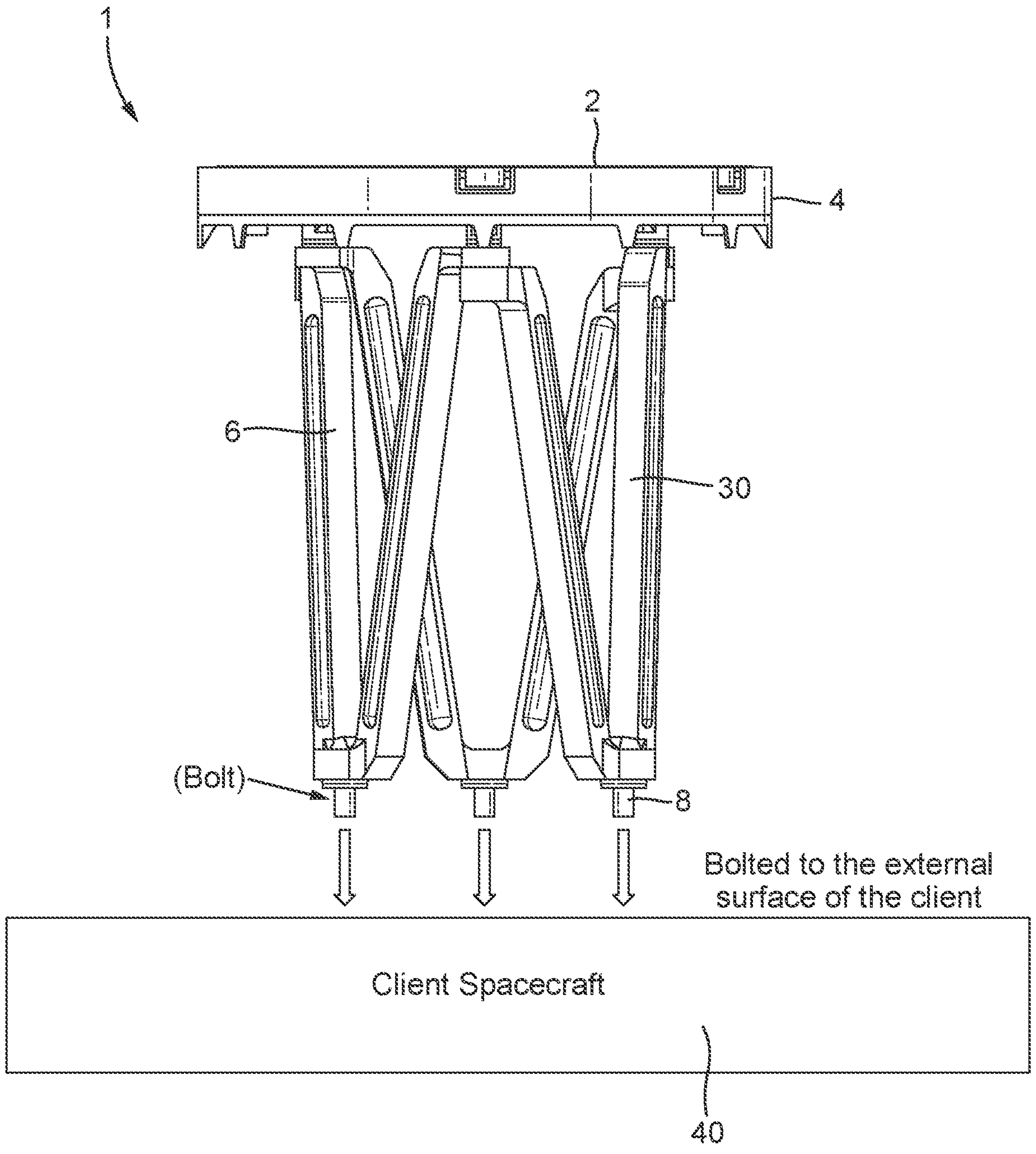
FIG. 6 shows how the docking structure shown in FIGS. 1, 2, 3*a*, 3*b*, 4 and 5 may be attached to a satellite.

FIG. 6 shows how, in one embodiment of the present invention, the docking structure 1 may be attached to a satellite 40 (a "client" spacecraft). As shown in FIG. 6, the docking structure 1 is bolted onto the satellite 40 via the mounting points 8 at the distal ends of the struts 30 of the attachment member 6. This spaces the magnetic plate 2 and the housing 4 of the docking structure 1 from the surface of the satellite 40. However, it will be appreciated that in some embodiments, the docking structure 1 may not include an attachment member 6; instead, the housing may be connected directly to (e.g. recessed in) the surface of the satellite 40.

Figure 7:
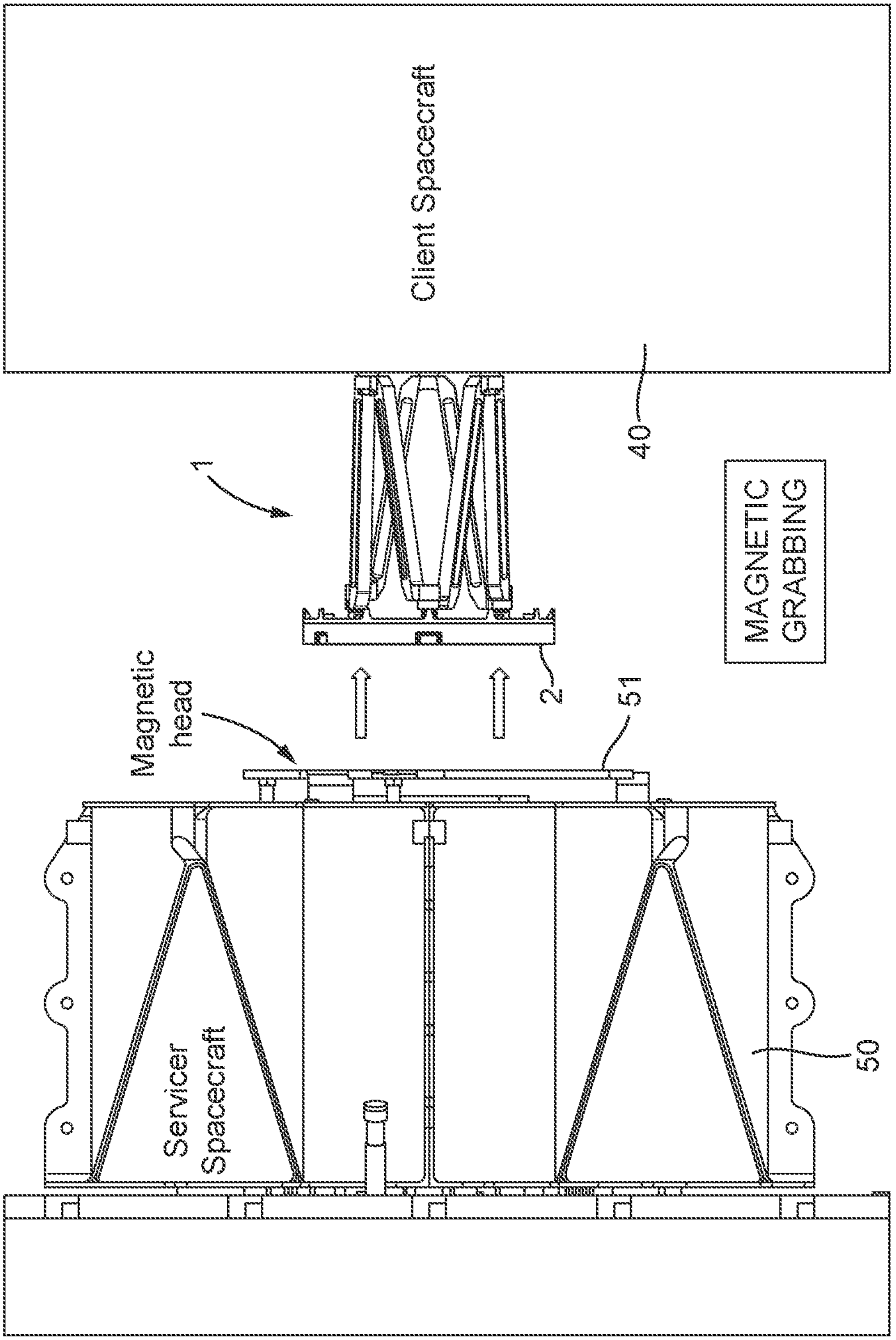
FIGS. 7 and 8 show how the docking structure shown in FIGS. 1, 2, 3*a*, 3*b*, 4 and 5 may be captured by another spacecraft.

FIG. 7 shows how, in one embodiment of the present invention, the docking structure 1 may be captured by another "servicer" spacecraft 50. The "servicer" spacecraft 50 has a magnetic head 51 that is positioned relative to the magnetic plate 2 of the docking structure 1 (that is attached to a satellite 40), such that the magnetic head 51 is aligned with the magnetic plate 2, as shown in FIG. 7.

As the "servicer" spacecraft 50 approaches the docking structure 1, the magnetic head 51 acts to attract the magnetic plate 2, causing the magnetic plate 2 to be connected to the magnetic head 51. Once the docking structure 1 is attached to the "servicer" spacecraft 50 (via the magnetic plate 2 being connected to the magnetic head 51), the satellite 40 to which the docking structure 1 is attached may then be manipulated, as desired, by the "servicer" spacecraft 50.

Figure 8:
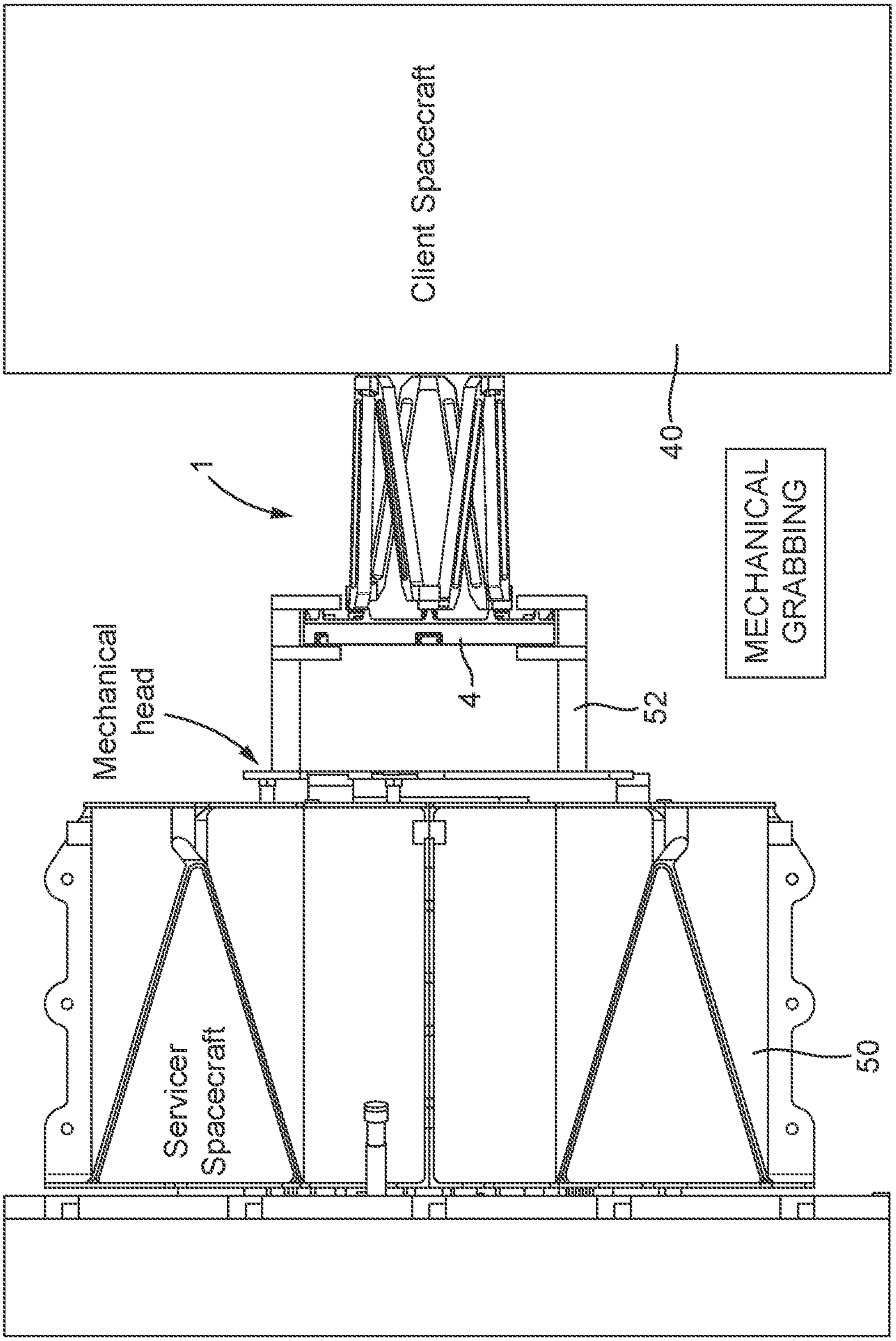

FIG. 8 shows how, in one embodiment of the present invention, the docking structure 1 may be captured by another "servicer" spacecraft 50. The "servicer" spacecraft 50 has a mechanical head 52 that is positioned relative to the housing 4 of the docking structure 1 (that is attached to a satellite 40), such that the mechanical head 52 is aligned with the housing 4, as shown in FIG. 8.

As the "servicer" spacecraft 50 approaches the docking structure 1, the mechanical head 52 is used to mechanically grab the housing 4, causing the housing 4 to be connected to the mechanical head 52. Once the docking structure 1 is attached to the "servicer" spacecraft 50 (via the housing 4 being connected to the mechanical head 52), the satellite 40 to which the docking structure 1 is attached may then be manipulated, as desired, by the "servicer" spacecraft 50.

Another docking structure according to an embodiment the present invention, similar to the docking structure shown in FIGS. 1-5, will now be described with reference to FIGS. 9-14.

Figure 9:
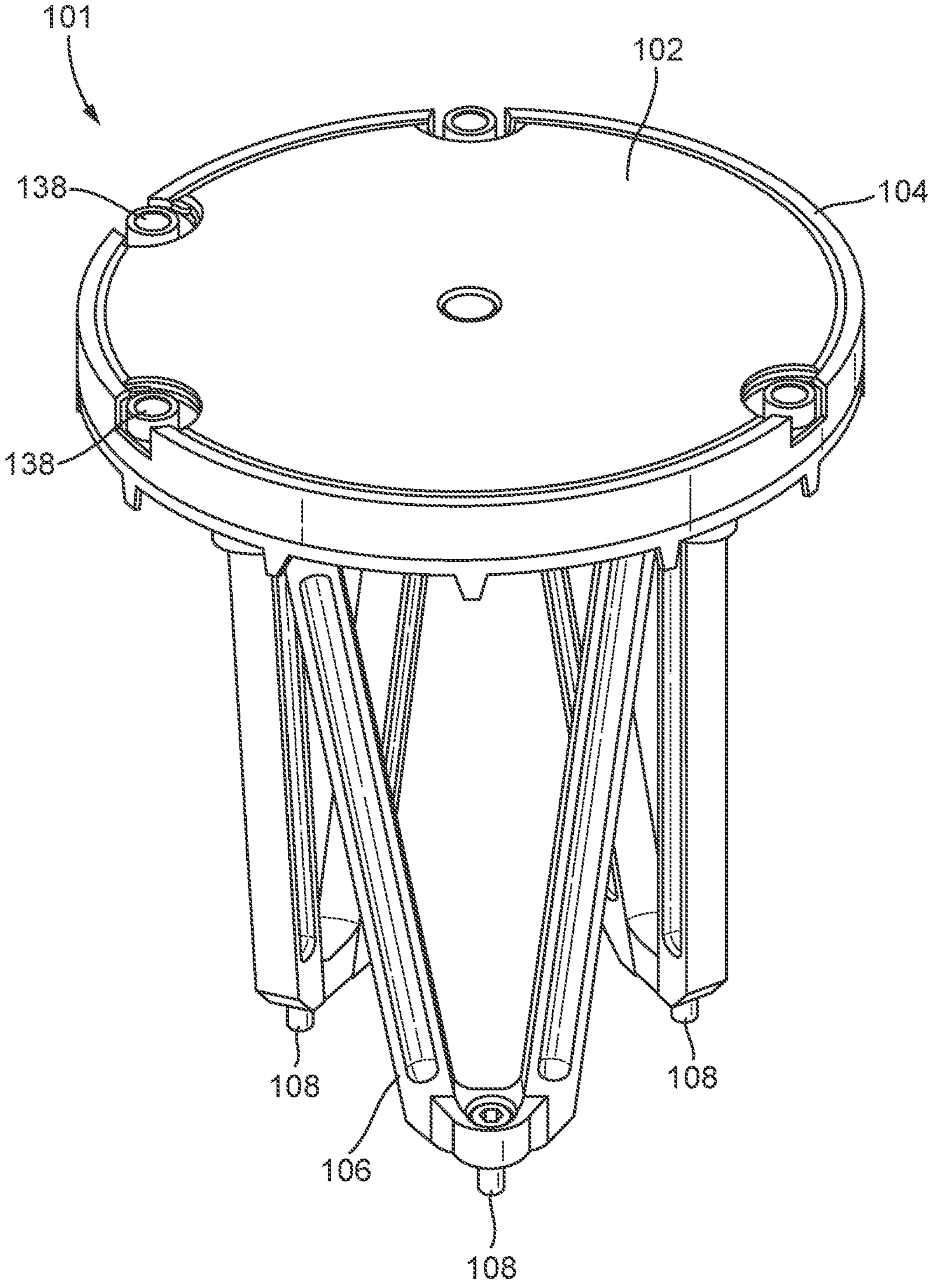
FIG. 9 shows a perspective view of a docking structure for attaching to a satellite, according to an embodiment of the present invention.

FIG. 9 shows a perspective view of a docking structure 101 for attaching to a satellite, according to an embodiment of the present invention. The docking structure 101 includes a magnetic plate 102, a housing 104 and an attachment member 106 for attaching the docking structure 101 to a satellite.

The magnetic plate 102 is made from Hiperco® 50 steel, which is a magnetically soft ferromagnetic material. The magnetic plate 102 is mounted on and constrained by the housing 104. The housing 104 is made from 7075-T6 aluminium alloy. Four reflective circular fiducial markers 138 are arranged around the perimeter of the housing 104.

The attachment member 106, which is also made from 7075-T6 aluminium alloy, is connected to the opposite side of the housing 104. The attachment member 106 includes three mounting points 108 for attaching the docking structure 101 to a satellite.

Figure 10:
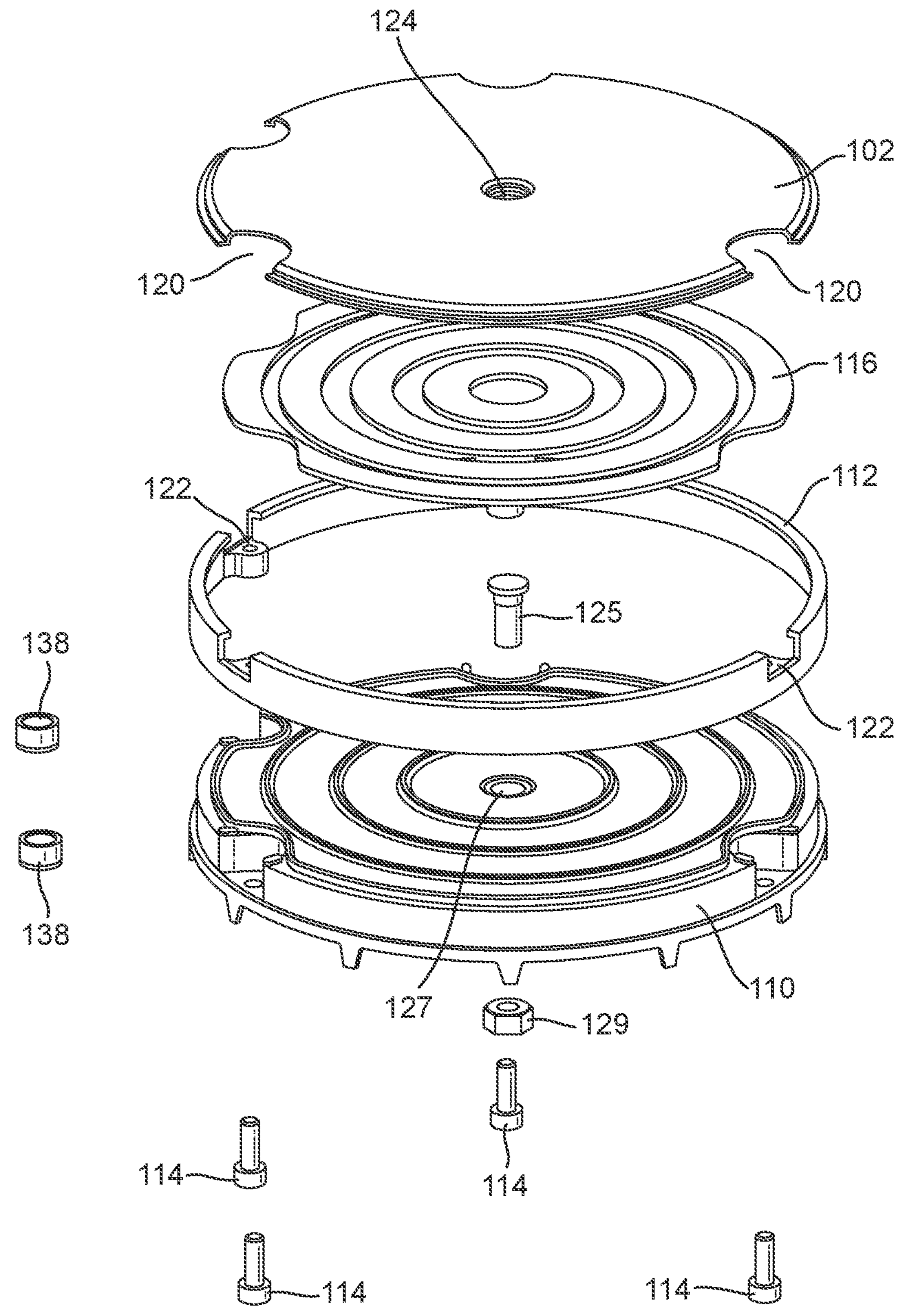
FIG. 10 shows an exploded view of the magnetic plate and the housing of the docking structure shown in FIG. 9.

FIG. 10 shows an exploded view of the magnetic plate 102 and the housing 104 of the docking structure 101 shown in FIG. 9. The housing 104 includes two main parts: a base plate 110 and an outer rim 112. The base plate 110 and the outer rim 112 are connected together by bolts 114 that pass through the respective perimeters of the base plate 110 and the outer rim 112. The base plate 110 and the outer rim 112, when connected together by the bolts 114, act to sandwich the magnetic plate 102 in the housing 104.

FIG. 10 also shows that the docking structure 1 includes four concentric silicone rubber rings 116 (made from space grade silicone rubber) between the base plate 110 of the housing 104 and the magnetic plate 102. The silicone rubber rings 116 are positioned between concentric circular ridges in the base plate 110, and act to hold the magnetic plate 102 in the housing 104, and provide some tolerance between the various components, e.g. to absorb vibrations on launch of the satellite.

FIG. 10 also shows that the magnetic plate 102 has a generally circular shape with scalloped indents 120. The outer rim 112 of the housing 104 has projections 122 that correspond to and mate with the indents 120 of the magnetic plate 102.

The magnetic plate 102 has a central aperture 124 through which an bolt 125 passes. The bolt 125 passes through a corresponding aperture 127 in the base plate 110 and is fastened with a nut 129.

Figure 11A:
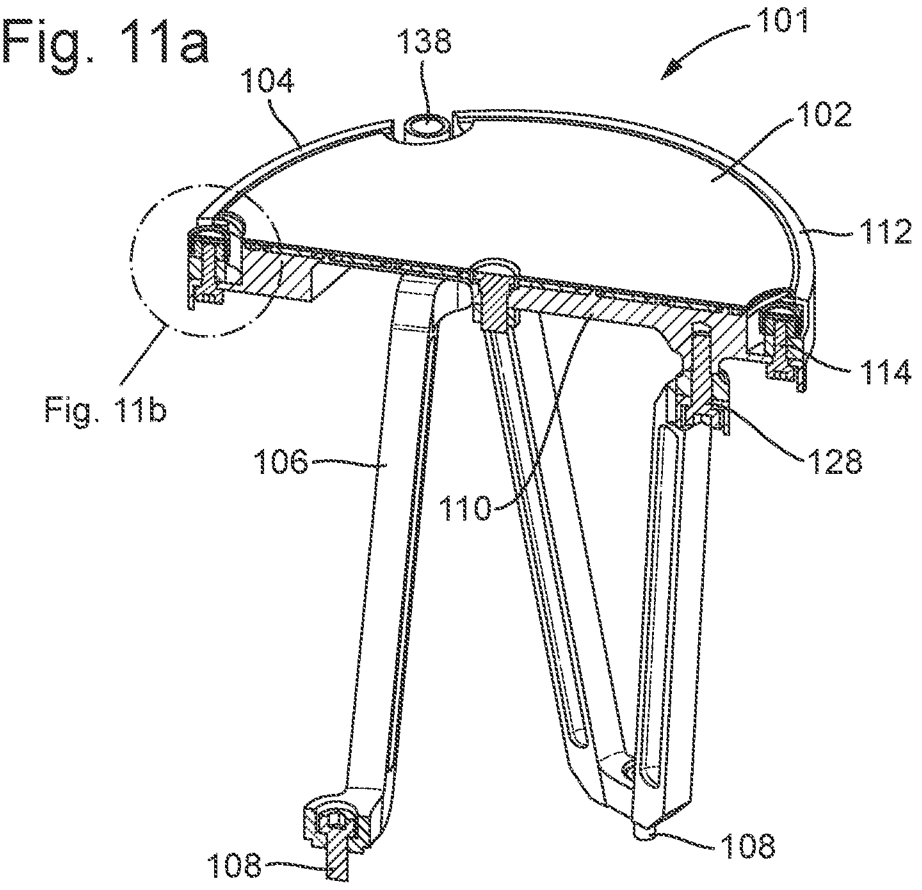
FIGS. 11*a*, 11*b*, 12*a* and 12*b* show cross-sectional views of the docking structure shown in FIGS. 9 and 10.
Figure 11B:
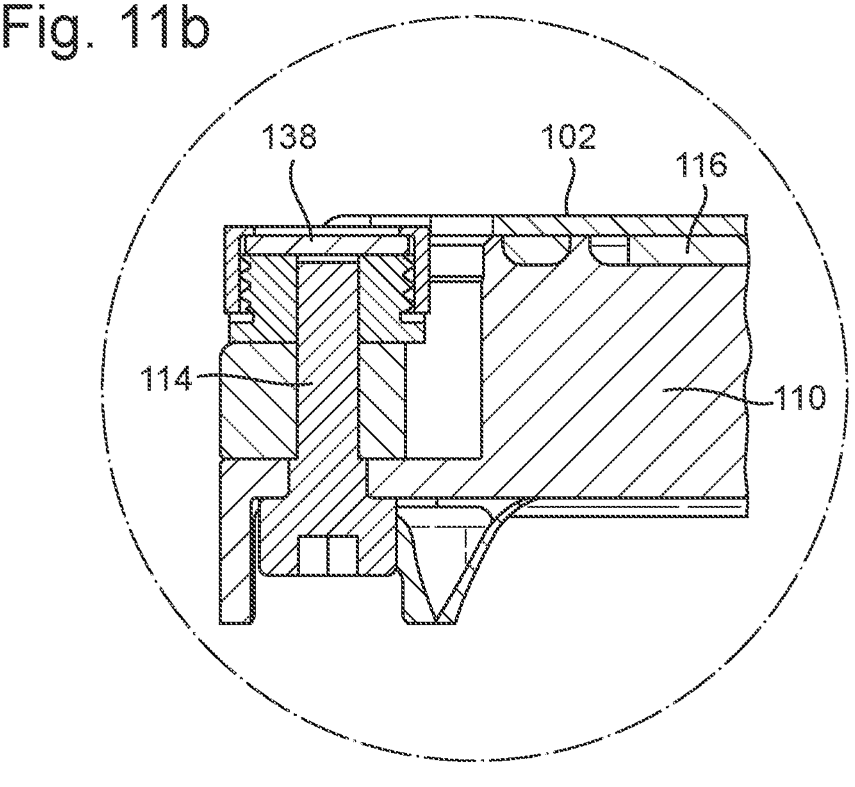
Figure 12A:
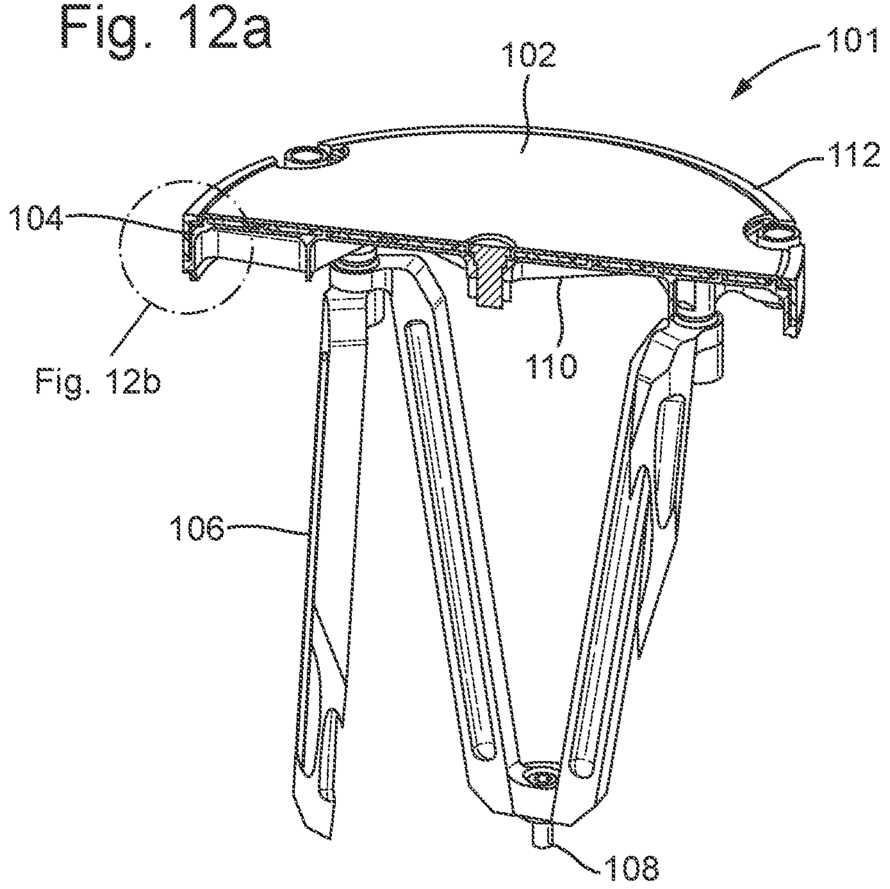
Figure 12B:
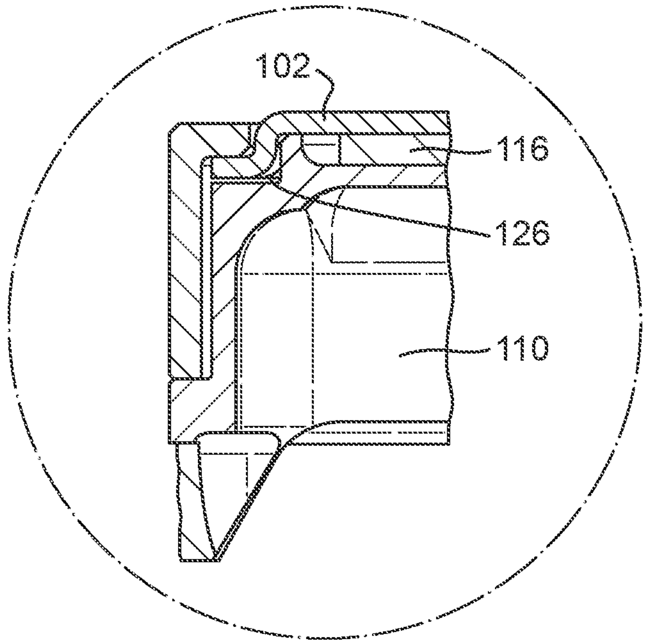

FIGS. 11*a*, 11*b*, 12*a* and 12*b* show cross-sectional views of the docking structure 101 shown in FIGS. 9 and 10. FIG. 11*b* is an enlarged section of FIG. 11*a* and FIG. 12*b* is an enlarged section of FIG. 12*a*.

The cross-sectional views of FIGS. 11*a* and 11*b* illustrate how the base plate 110 and the outer rim 112 of the housing 104 are connected together by bolts 114 that pass through the respective perimeters of the base plate 110 and the outer rim 112. The base plate 110 and the outer rim 112, when connected together by the bolts 114, act to sandwich the magnetic plate 102 in the housing 104. The bolts 114 that hold the base plate 110 and the outer rim 112 of the housing 104 together pass through the base plate 110 to screw into the perimeter of the outer rim 112, in the scalloped projections 122 of the outer rim 112.

FIGS. 11*a* and 11*b* also show that the reflective circular fiducial markers 138 screw onto and form a cap on top of the bolts 114.

FIG. 11*a* also shows that the attachment member 106 connects to the base plate 110 of the housing 104 via three mounting points 128 (only one of which can be seen in FIG. 11*a*), with a bolt passing through each mounting point 128 to screw into the base plate 110 of the housing 104.

The cross-sectional views of FIGS. 12*a* and 12*b* illustrate how the base plate 110 and the outer rim 112 of the housing 104 sandwich the magnetic plate 102 therebetween.

As can be seen most clearly in FIG. 12*b*, the magnetic plate 102 comprises a Z-shaped step and lip at the perimeter of the magnetic plate 102. The base plate 110 and the outer rim 112 of the housing 104 are shaped so to form an corner shaped groove 126 in the housing 104, corresponding to the Z-shaped step and lip of the magnetic plate 102. The silicone rubber ring 116, between the base plate 110 of the housing 104 and the magnetic plate 102, helps to cushion the magnetic plate 102 on the base plate 110 of the housing 104.

Figure 13:
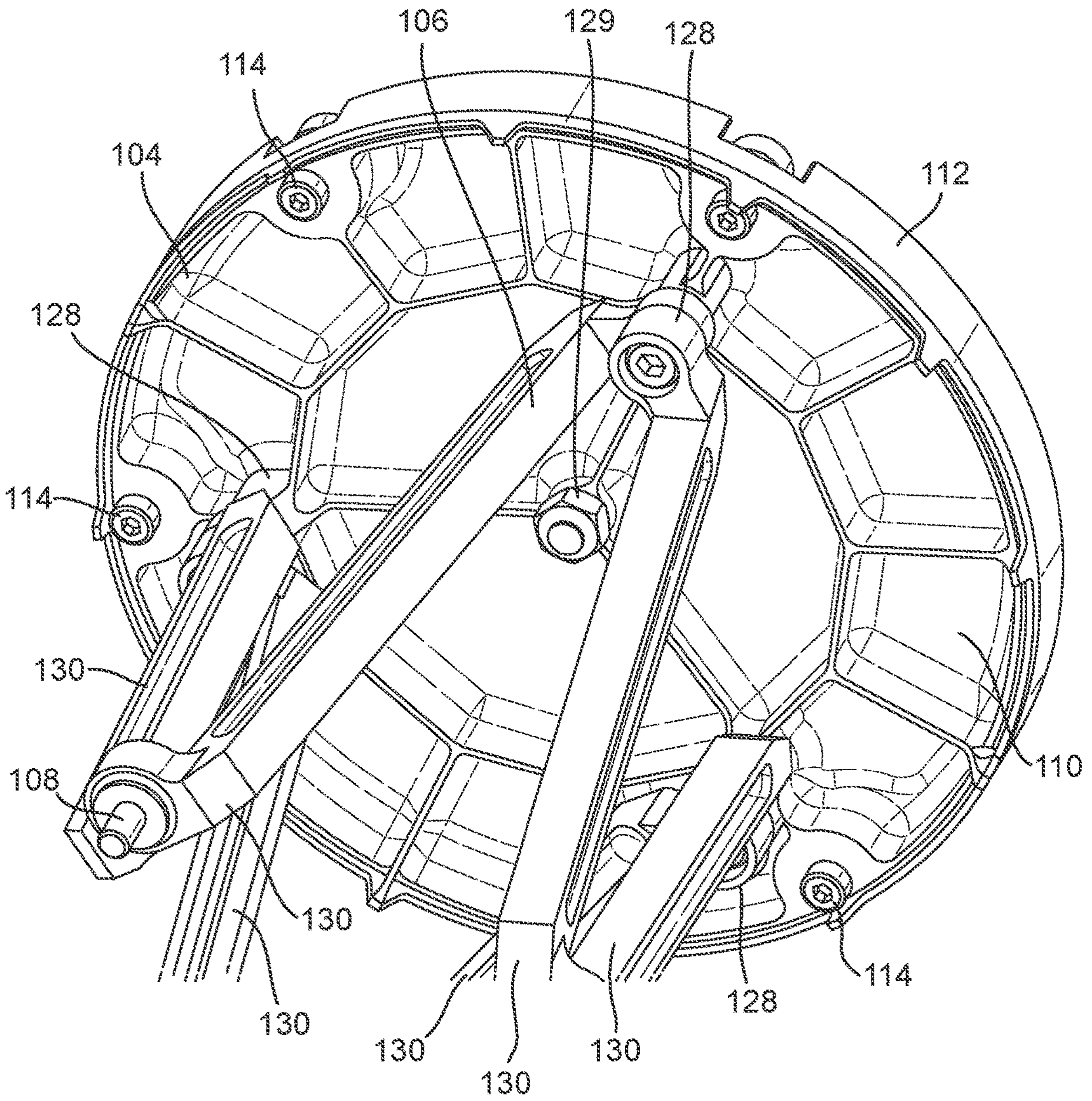
FIG. 13 shows a different perspective view of the docking structure shown in FIGS. 9, 10, 11*a*, 11*b*, 12*a* and 12*b*.

FIG. 13 shows a different perspective view of the docking structure 101 shown in FIGS. 9, 10, 11*a*, 11*b*, 12*a* and 12*b*. From this angle, the three mounting points 128 for the attachment member 106 to connect to the base plate 110 of the housing 104 can be seen. The attachment member 106 has six struts 130, two of which meet at each mounting point 128. Two struts 130 also meet at each of the mounting points 108 for attaching the docking structure 101 to a satellite, such that the six struts 130 form a zig-zag configuration of the attachment member 106.

FIG. 13 also shows the bolts 114 that pass through the base plate 110 of the housing 104 to screw into the perimeter of the outer rim 112, in order to hold the housing 104 together. FIG. 13 further shows the nut 129 that is used to fasten the bolt that passes through the central apertures of the magnetic plate 102 and the base plate 110 to connect them together.

Figure 14:
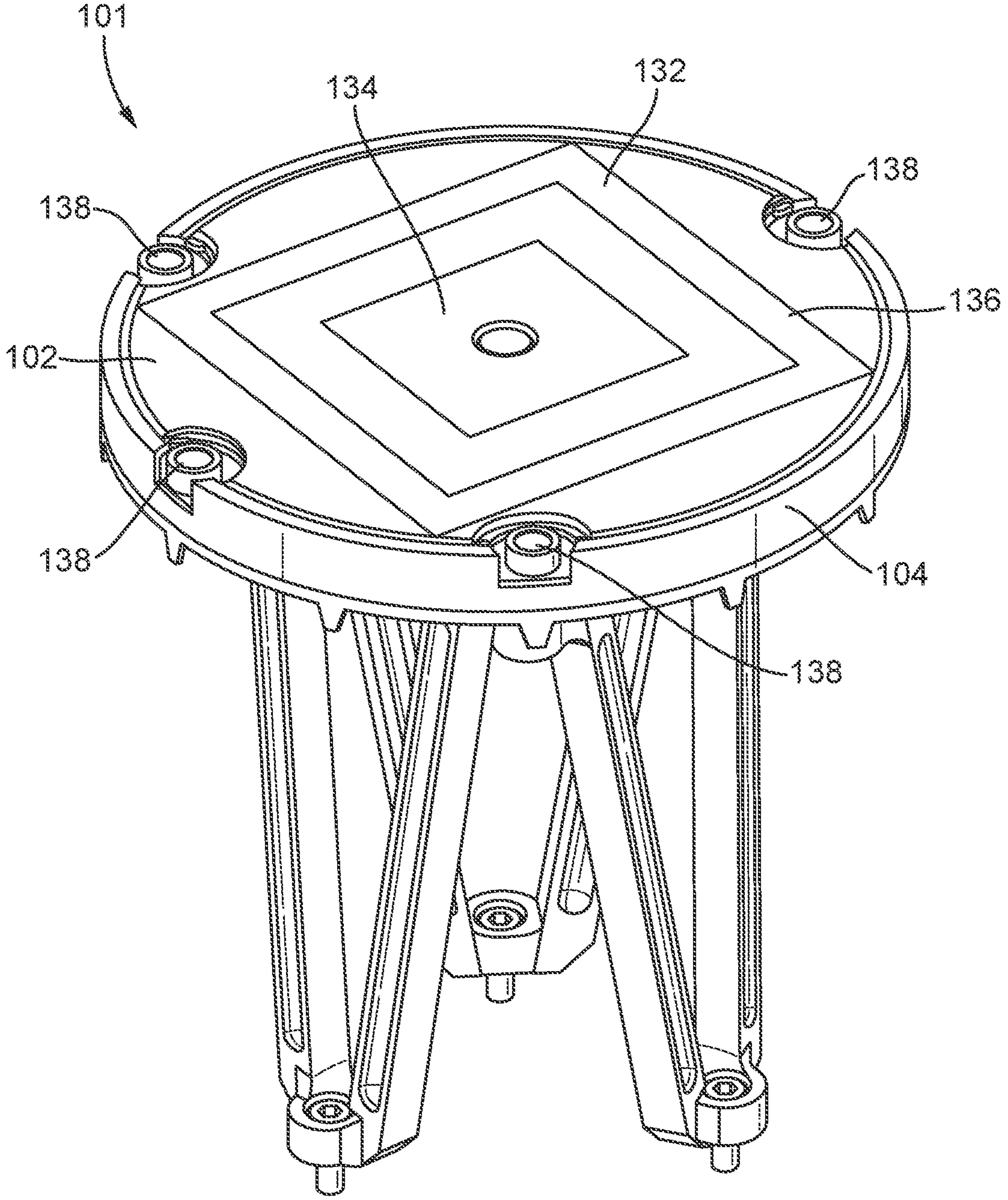
FIG. 14 shows another perspective view of the docking structure shown in FIGS. 9, 10, 11*a*, 11*b*, 12*a*, 12*b* and 13.

FIG. 14 shows another perspective view of the docking structure 101 shown in FIGS. 9, 10, 11*a*, 11*b*, 12*a*, 12*b* and 13. The docking structure 101 is shown with a cover 132 over the magnetic plate 102 and the housing 104. The cover 132 has multiple fiducial markers 134, 136, 138 formed thereon. The fiducial markers 134, 136, 138 include a central square 134, an outer square annulus 136 and four circles 138.

The circular fiducial markers 138 are formed from reflective material. The central square 134 comprises an ArUco marker. The outer square annulus 136 comprises gaps in the sides of the annulus to form four "L" shapes, three of them having a different aspect ratio of the lengths of the legs of the respective "L" shape. The fiducial markers 134, 136, 138 help the docking structure 101 to be identified and located by a capturing satellite, and help the capturing satellite to orient itself relative to the docking structure 101. The differently shaped and sized fiducial markers 134, 136, 138 help the docking structure 101 to be identified and located at a range of different distances away from the docking structure 101.

It will be appreciated that the docking structure 101 shown in FIGS. 9-14 may be used as shown in FIGS. 6-8, to be attached to a satellite 40 and be captured with a capturing system of a "servicer" spacecraft 50, in a similar way as described for the docking structure 1 shown in FIGS. 1-5.

It will be seen from the above that in at least preferred embodiments, the docking structure of the present invention is constructed in such a way that enables the housing and the magnetic plate to be decoupled from each other, which the most suitable materials for the housing and the magnetic plate to be chosen. This helps to main mechanical robustness and durability of the docking structure and helps to reduce the effect of thermal cycles, which can be extreme in space, on the different components of the docking structure.

The capture of a satellite by the magnetic plate may be used for one of a number of operations, not limited to, but including, removing a satellite from orbit, relocating a satellite to a different orbit and performing in or on orbit servicing of a satellite.

The invention claimed is:

1. A docking structure for a satellite, the docking structure comprising:
   - a magnetic plate; and
   - a housing for mounting and constraining the magnetic plate;
   - wherein the magnetic plate comprises an outer face and an inner face;
   - wherein the magnetic plate comprises a soft magnetic material; and
   - wherein the housing extends around at least part of a perimeter of the magnetic plate, over at least part of the outer face of the magnetic plate and over at least part of the inner face of the magnetic plate to mount and constrain the magnetic plate;
   - wherein the docking structure comprises a resilient material between at least part of the housing and the magnetic plate; and
   - wherein a base plate of the housing comprises one or more projections that contact an inner face of the magnetic plate, and wherein the resilient material is arranged between the one or more projections.

2. The docking structure as claimed in claim 1, wherein the magnetic plate comprises a step around at least part of the perimeter of the magnetic plate.

3. The docking structure as claimed in claim 1, wherein the magnetic plate comprises a lip around at least part of the perimeter of the magnetic plate.

4. The docking structure as claimed in claim 1, wherein the magnetic plate comprises a step and a lip around at least part of the perimeter of the magnetic plate, wherein the lip extends towards the perimeter of the magnetic plate from the step.

5. The docking structure as claimed in claim 1, wherein the magnetic plate comprises a non-permanent magnetic material.

6. The docking structure as claimed in claim 1, wherein the housing comprises an aperture, wherein the outer face of the magnetic plate is mounted in the aperture of the housing.

7. The docking structure as claimed in claim 1, wherein the housing comprises an outer rim arranged to retain the magnetic plate, and a base plate adjacent the inner face of the magnetic plate.

8. The docking structure as claimed in claim 7, wherein the outer rim projects inwards from the perimeter of the housing; and/or
   - wherein the housing comprises one or more fasteners to connect the base plate to the outer rim.

9. The docking structure as claimed in claim 1, wherein the housing comprises a groove that receives at least a part of the perimeter of the magnetic plate.

10. The docking structure as claimed in claim 1, wherein the housing comprises a groove that is formed between the base plate and an outer rim of the housing, wherein the groove receives at least a part of the perimeter of the magnetic plate.

11. The docking structure as claimed in claim 1, wherein the docking structure comprises one or more fasteners that connect the magnetic plate to the housing.

12. The docking structure as claimed in claim 1, wherein the one or more projections comprise one or more ridges.

13. The docking structure as claimed in claim 1, wherein the docking structure comprises an attachment member connected to the housing for attaching the docking structure to a satellite.

14. The docking structure as claimed in claim 1, wherein the docking structure comprises one or more fiducial markers.

15. The docking structure as claimed in claim 14, wherein the docking structure comprises a plurality of fiducial markers, wherein the plurality of fiducial markers are a plurality of different shapes and/or sizes; and/or
   - wherein one or more of the one or more fiducial markers comprises a pattern and/or is reflective.

16. The docking structure as claimed in claim 15, wherein one of the fiducial markers substantially surrounds another of the fiducial markers; and/or
   - wherein the magnetic plate comprises a plurality of concentrically arranged fiducial markers and a plurality of circular fiducial markers.

* * * * *